US008762996B2

(12) United States Patent
Otsuka

(10) Patent No.: US 8,762,996 B2
(45) Date of Patent: Jun. 24, 2014

(54) PROGRAM AND INFORMATION PROCESSING APPARATUS DETERMINING AN EXECUTION ORDER OF SEQUENTIALLY EXECUTING PROCESSES ON A TARGET INFORMATION BASED ON POSSIBILITIES OF SUCCESS OF EXECUTION

(75) Inventor: Toru Otsuka, Kawasaki (JP)

(73) Assignee: Fuji Xerox Co., Ltd., Tokyo (JP)

(*) Notice: Subject to any disclaimer, the term of this patent is extended or adjusted under 35 U.S.C. 154(b) by 1138 days.

(21) Appl. No.: 12/482,206

(22) Filed: Jun. 10, 2009

(65) Prior Publication Data

US 2010/0153694 A1 Jun. 17, 2010

(30) Foreign Application Priority Data

Dec. 16, 2008 (JP) ................................ 2008-319589

(51) Int. Cl.
  *G06F 9/46* (2006.01)
  *G06F 7/38* (2006.01)
(52) U.S. Cl.
  USPC ........................... 718/102; 718/101; 712/245
(58) Field of Classification Search
  None
  See application file for complete search history.

(56) References Cited

U.S. PATENT DOCUMENTS

| | | | | |
|---|---|---|---|---|
| 5,465,354 A | * | 11/1995 | Hirosawa et al. | 718/106 |
| 6,505,228 B1 | * | 1/2003 | Schoening et al. | 718/106 |
| 6,640,299 B1 | * | 10/2003 | Mang et al. | 712/245 |
| 7,930,700 B1 | * | 4/2011 | Basu et al. | 718/102 |
| 2002/0188653 A1 | * | 12/2002 | Sun | 709/201 |
| 2004/0054998 A1 | * | 3/2004 | Hayashi | 718/102 |
| 2005/0076335 A1 | * | 4/2005 | Cavage et al. | 718/100 |
| 2005/0102723 A1 | * | 5/2005 | Van Den Nieuwelaar et al. | D18/1 |
| 2006/0048155 A1 | * | 3/2006 | Wu et al. | 718/101 |
| 2007/0006234 A1 | * | 1/2007 | Ogata | 718/101 |
| 2007/0118838 A1 | * | 5/2007 | Tsujino et al. | 718/103 |
| 2008/0301679 A1 | * | 12/2008 | Osogami | 718/100 |

FOREIGN PATENT DOCUMENTS

| | | |
|---|---|---|
| JP | 2002-032249 A | 1/2002 |
| JP | 2006-338210 A | 12/2006 |

OTHER PUBLICATIONS

Notification of Reasons for Refusal, issued Sep. 7, 2010, in counterpart Japanese Application No. 2008-319589.

* cited by examiner

*Primary Examiner* — Meng An
*Assistant Examiner* — Tammy Lee
(74) *Attorney, Agent, or Firm* — Sughrue Mion, PLLC

(57) ABSTRACT

A computer readable medium includes: storing an evaluation value and relating, to a plurality of evaluating target information, the evaluation value indicative of a possibility that a second processing for sequentially executing a first processing that is predetermined for each of the evaluating target information is successful; updating the evaluation value related to the evaluating target information based on a content of a third processing that is predetermined for the evaluating target information or information to be a processing target of the first processing corresponding to the evaluating target information when the third processing is executed; and determining an executing order in a sequential execution of the second processing for each of the evaluating target information based on the evaluation value.

12 Claims, 9 Drawing Sheets

FIG. 5

| ENTITY INFORMATION IDENTIFIER | PROCESSING NAME | PERMITTED USER INFORMATION |
|---|---|---|
| 1 | DELETE | ALL |
| 1 | AUTHORITY CHANGE | ALL |
| 2 | DELETE | ALL |
| 2 | AUTHORITY CHANGE | A, B |
| 2 | AUTHORITY CHANGE | OTHER THAN A AND B |

FIG. 6

| ENTITY INFORMATION IDENTIFIER | SEQUENTIAL PROCESSING NAME | REQUEST USER INFORMATION | EVALUATION VALUE | EVALUATION VALUE INCREASE/DECREASE INFORMATION |
|---|---|---|---|---|
| 1 | SEQUENTIAL DELETE | ALL | 100% | FALSE |
| 1 | SEQUENTIAL AUTHORITY CHANGE | A, B | 100% | FALSE |
| 1 | SEQUENTIAL AUTHORITY CHANGE | OTHER THAN A AND B | 0% | TRUE | ured out in
PROGRAM AND INFORMATION PROCESSING APPARATUS DETERMINING AN EXECUTION ORDER OF SEQUENTIALLY EXECUTING PROCESSES ON A TARGET INFORMATION BASED ON POSSIBILITIES OF SUCCESS OF EXECUTION

CROSS-REFERENCE TO RELATED APPLICATION

This application is based on and claims priority under 35 USC 119 from Japanese Patent Application No. 2008-319589 filed Dec. 16, 2008.

BACKGROUND

Technical Field

The present invention relates to a program and an information processing apparatus.

SUMMARY

According to an aspect of the invention, a computer readable medium includes: storing an evaluation value and relating, to a plurality of evaluating target information, the evaluation value indicative of a possibility that a second processing for sequentially executing a first processing that is predetermined for each of the evaluating target information is successful; updating the evaluation value related to the evaluating target information based on a content of a third processing that is predetermined for the evaluating target information or information to be a processing target of the first processing corresponding to the evaluating target information when the third processing is executed; and determining an executing order in a sequential execution of the second processing for each of the evaluating target information based on the evaluation value.

According to the aspect of the invention, it is possible to suppress a consumption of a resource related to a computer or an apparatus in a sequential execution of a processing for electronic information more greatly as compared with the case in which the structure is not employed.

BRIEF DESCRIPTION OF THE DRAWINGS

Exemplary embodiments of the invention will be described in detail based on the following figures, wherein:

FIG. 5 is a diagram showing an example of authority information;

FIG. 6 is a diagram showing an example of evaluation value information;

DETAILED DESCRIPTION

An exemplary embodiment according to the invention will be described below in detail with reference to the drawings.

Figure 1:
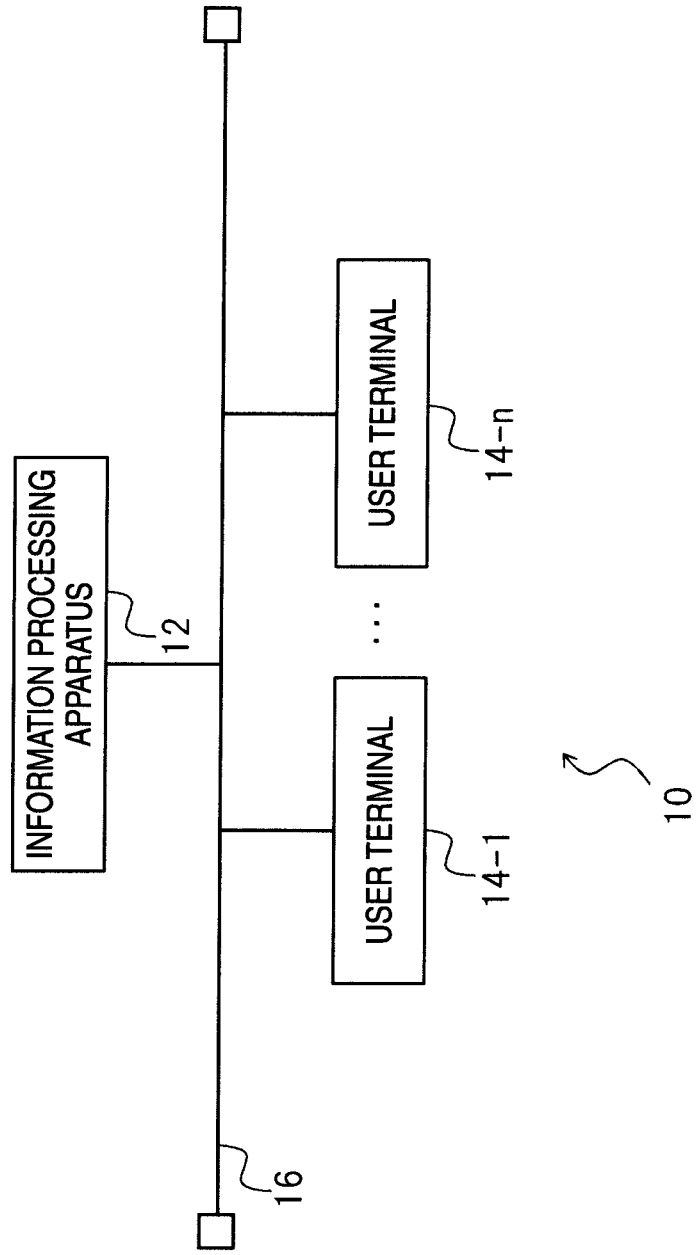
FIG. 1 is a diagram showing an example of a network structure of an information processing system according to an exemplary embodiment of the invention.

As is illustrated in a network structure diagram of FIG. 1, an information processing system 10 according to the exemplary embodiment is constituted to include an information processing apparatus 12 and a user terminal (a client) 14 (14-1 to 14-$n$). The information processing apparatus 12 and the user terminal 14 are connected to a network 16 such as Internet and are caused to communicate with each other.

The user terminal 14 illustrated in FIG. 1 is constituted by a well-known personal computer including a control device such as a CPU, a storage device such as a hard disk, an output device such as a display, an input device such as a keyboard or a mouse, and a communicating device such as a network board.

Figure 2:
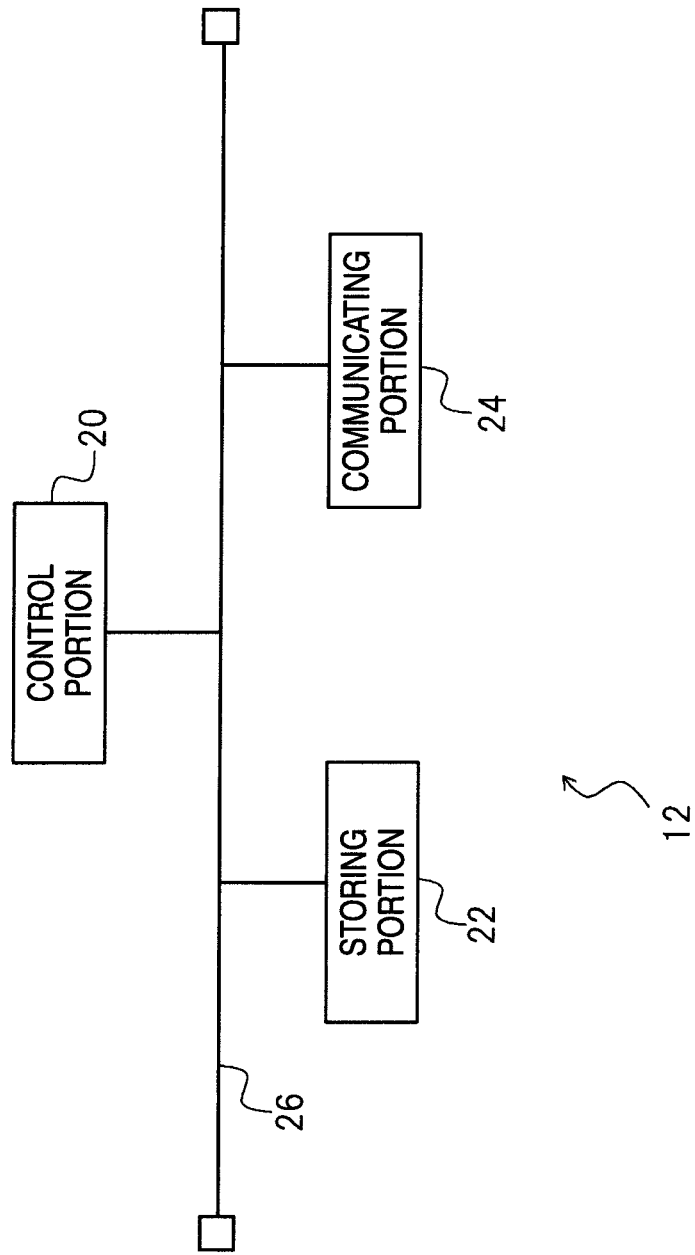
FIG. 2 is a diagram showing an example of a hardware structure of an information processing apparatus according to the exemplary embodiment of the invention.

FIG. 2 is a diagram showing an example of a hardware structure of the information processing apparatus 12 according to the exemplary embodiment. As is illustrated in FIG. 2, the information processing apparatus 12 according to the exemplary embodiment is constituted to include a control portion 20, a storing portion 22 and a communicating portion 24. The elements are connected to each other through a bus 26.

The control portion 20 is a program control device such as a CPU and is operated in accordance with a program installed in the information processing apparatus 12.

The storing portion 22 is a storage element or a hard disk such as an ROM or an RAM. The storing portion 22 stores a program to be executed by the control portion 20. Moreover, the storing portion 22 is also operated as a work memory for the control portion 20.

The communicating portion 24 is a communication interface such as a network board and serves to transmit/receive information to/from the user terminal 14.

Figure 3:
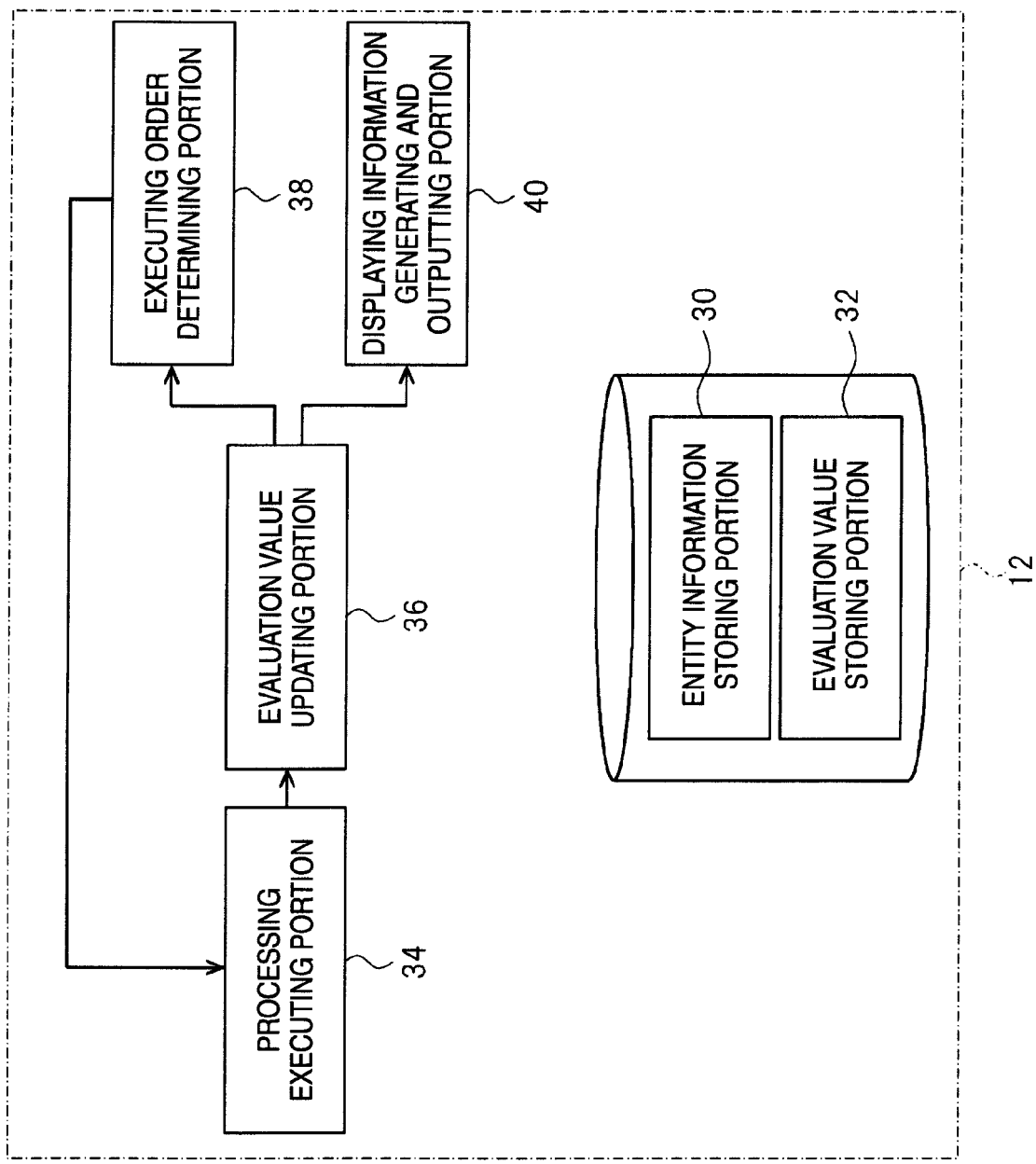
FIG. 3 is a functional block diagram showing an example of a function implemented by the information processing apparatus according to the exemplary embodiment of the invention.

FIG. 3 is a functional block diagram showing an example of a function to be implemented by the information processing apparatus 12 according to the exemplary embodiment.

As is illustrated in FIG. 3, the information processing apparatus 12 functions to include entity information storing portion 30, an evaluation value storing portion 32, a processing executing portion 34, an evaluation value updating portion 36, an executing order determining portion 38 and a displaying information generating and outputting portion 40. The entity information storing portion 30 and the evaluation value storing portion 32 mainly implement the storing portion 22. The other elements mainly implement the control portion 20.

The elements are implemented by executing, through the control portion 20, the program installed in the information processing apparatus 12 to be a computer. The program is supplied to the information processing apparatus 12 through a computer readable information transmitting medium such as a CD-ROM or a DVD-ROM or a communicating network such as Internet.

Figure 4:
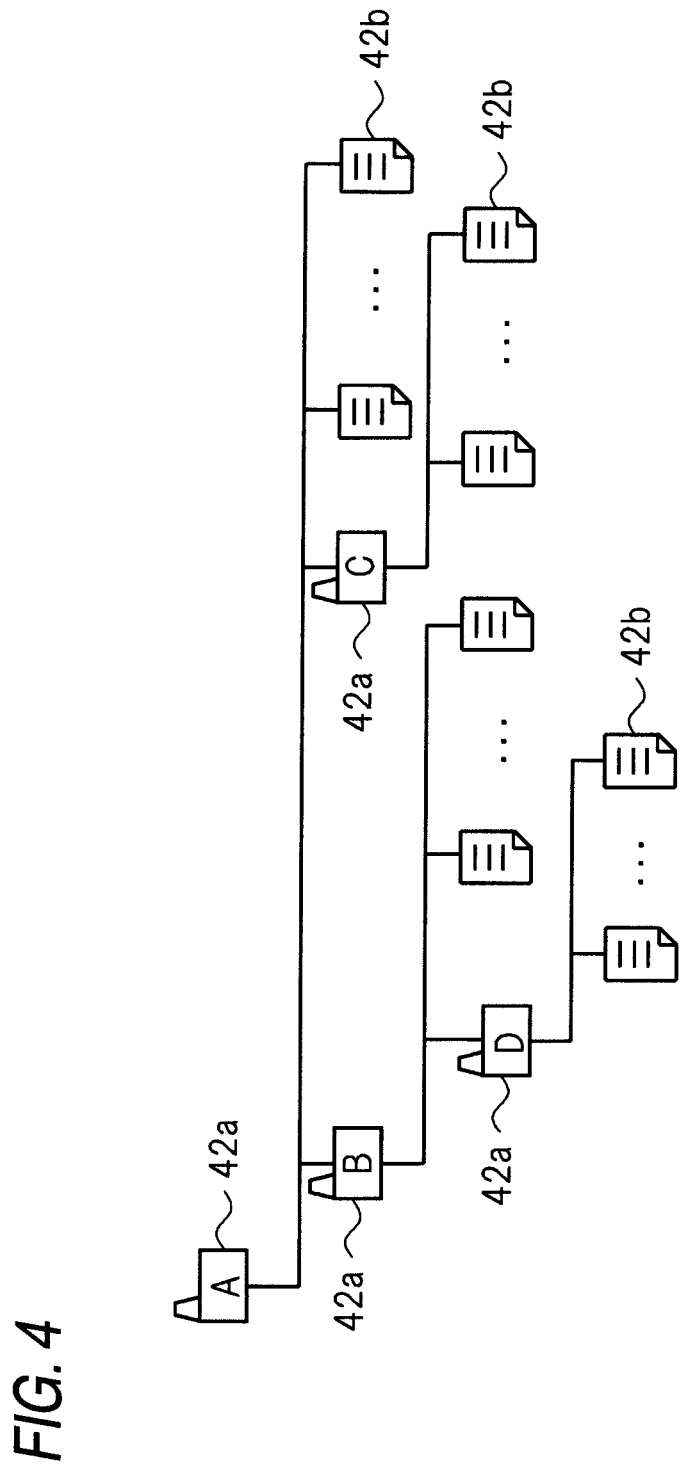
FIG. 4 is a diagram showing an example of entity information.

The entity information storing portion 30 stores entity information (plural of entity information in the exemplary embodiment) such as document information 42 (for example, a folder 42a or a file 42b) (see FIG. 4). FIG. 4 shows an example of the entity information (for example, the folder 42a and the file 42b) stored in the entity information storing portion 30 according to the exemplary embodiment. The entity information is not restricted to the document information 42 but may be information (for example, system information) having a hierarchical structure (a tree structure), for example.

In the exemplary embodiment, the entity information storing portion 30 stores the document information 42 such as the folder 42a and the file 42b in relation to each other as is illustrated in FIG. 4. More specifically, the entity information storing portion 30 stores the document information 42 and parent-child relationship information indicative of a parent-child relationship between the document information 42 (for example, information indicative of a combination of an identifier of the document information 42 to be a parent and that of the document information 42 to be a child), for example. As is illustrated in FIG. 4, in the exemplary embodiment, plural of document information 42 including a folder 42a having a name of "B" (a folder 42a(B)) and a folder 42a having a name of "C" (a folder 42a(C)) is related as the child document information 42 to a folder 42a having a name of "A" (a folder 42a(A)). Plural of document information 42 including a folder 42a having a name of "D" (a folder 42a(D)) is related as the child document information 42 to the folder 42a(B). Plural of document information 42 is related as the child document information 42 to the folder 42a(C). Plural of document information 42 is related as the child document information 42 to the folder 42a(D).

In the exemplary embodiment, the entity information storing portion 30 stores information (in the exemplary embodiment, for example, authority information 44) indicative of a condition of a user permitted to execute a processing for each document information 42 (for example, a read processing, an update processing or a deletion processing) in relation to the document information 42 (see FIG. 5). In the exemplary embodiment, the authority information 44 includes an entity information identifier 46 to be an identifier of entity information such as the document information 42 to be related, a processing name 48 indicative of the content of the processing, and permitted user information 50 indicative of a user permitted to execute the processing, for example.

The evaluation value storing portion 32 stores evaluation value information 52 illustrated in FIG. 6. In the exemplary embodiment, as is illustrated in FIG. 6, the evaluation value information 52 includes the entity information identifier 46 to be an identifier of entity information, a sequential processing name 54 indicative of a name of a sequential processing (a batch processing) required for at least one entity information (hereinafter referred to as sequential processing target information) corresponding to the entity information (hereinafter referred to as evaluating target information) indicated by the entity information identifier 46, request user information 56 indicative of a user giving a request for a sequential processing to the entity information and a group to which the user belongs, an evaluation value 58 indicative of a possibility that the sequential processing corresponding to the sequential processing name 54 according to a request of the user that the request user information 56 is indicative might be successful (in the exemplary embodiment, for example, the evaluation value 58 is expressed in a percentage), and evaluation value increase/decrease information 60 (increase/decrease information for the evaluation value) taking two values of "true" and "false". More specifically, for example, the sequential processing name 54 indicates a name of a processing (a sequential deletion processing) for sequentially deleting the subsequent folders 42a to the certain folder 42a (corresponding to the evaluating target information) or the file 42b (corresponding to the sequential processing target information) (in a batch) and a name of a processing (a sequential authority change processing) for changing the authority information 44 related to the subsequent folders 42a to the certain folder 42a (corresponding to the evaluating target information) or the file 42b (corresponding to the sequential processing target information). Thus, the evaluation value 58 indicative of a possibility that a sequential processing for at least one sequential processing target corresponding to the evaluating target information might be successful is related to each of the evaluating target information. In the exemplary embodiment, moreover, the evaluation value 58 is also related to the user and the evaluation value increase/decrease information 60. In the exemplary embodiment, furthermore, the evaluation value 58 is related to each of plural types of sequential processings. The evaluation value increase/decrease information 60 will be described below in detail. In the exemplary embodiment, the evaluation value information 52 is related to each folder 42a. In other words, each folder 42a corresponds to the evaluating target information. Each folder 42a and each file 42b correspond to the sequential processing target information.

The processing executing portion 34 executes a processing corresponding to a request for the entity information which is given from the user in response to the request. More specifically, for example, the processing executing portion 34 accepts, from the user, a read processing request, an update processing request, a name change processing request, a deletion processing request, an authority change processing request or a request for adding the document information 42 into the folder 42a for individual entity information (the file 42b or the folder 42a). The processing executing portion 34 decides whether an execution of a processing is permitted for a user to be a processing request source or not based on the authority information 44 related to the entity information required to be processed. If it is decided that the execution of the processing is permitted, the processing executing portion 34 executes the processing corresponding to the request for the entity information, for example.

Moreover, the processing executing portion 34 accepts a sequential processing request (for example, a request for sequentially deleting the subsequent folders 42a to the certain folder 42a or the file 42b (in a batch)) and executes a sequential processing corresponding to the request. In the case in which the sequential processing is not successful, the processing executing portion 34 may execute a processing for carrying out a return into a state brought when the execution of the sequential processing is started (for example, updating to carry out the return) for at least a part (for example, the folder 42a or the file 42b which has already been deleted) of information to be a target of the sequential processing (for example, the subsequent folders 42a to the certain folder 42a or the file 42b).

The evaluation value updating portion 36 updates the evaluation value 58 related to the entity information based on a content of an evaluation value updating basic processing when the evaluation value updating basic processing is executed for the evaluating target information or the sequential processing target information corresponding to the evaluating target information. The processing for updating the evaluation value 58 through the evaluation value updating portion 36 will be described below in detail.

The executing order determining portion 38 determines an executing order for sequentially executing the sequential processing for each evaluating target information based on the evaluation value 58 related to the evaluating target information. Specifically, for example, the executing order determining portion 38 determines which is to be executed earlier, the sequential deletion processing for the subsequent document information 42 to the folder 42*a*(B) or the sequential deletion processing for the subsequent document information 42 to the folder 42*a*(C) based on the evaluation value 58 related to the folder 42*a*(B) and the evaluation value 58 related to the folder 42*a*(C) when executing the sequential deletion of the subsequent document information 42 to the folder 42*a*(A) in response to a request given from the user. More specifically, for example, the executing order determining portion 38 determines the executing order to execute the sequential deletion processing for the subsequent document information 42 to the folder 42*a* in ascending order of the evaluation value 58 related to the folder 42*a*. In the case in which the evaluation value 58 is related to the user as in the evaluation value information 52 illustrated in FIG. 6, the executing order determining portion 38 may determine the executing order for sequentially executing the sequential processing for each evaluating target information based on the evaluation value 58 related to the user giving a request for sequentially executing the sequential processing.

The processing executing portion 34 may execute the sequential processing in accordance with the executing order determined by the executing order determining portion 38.

Figure 7:
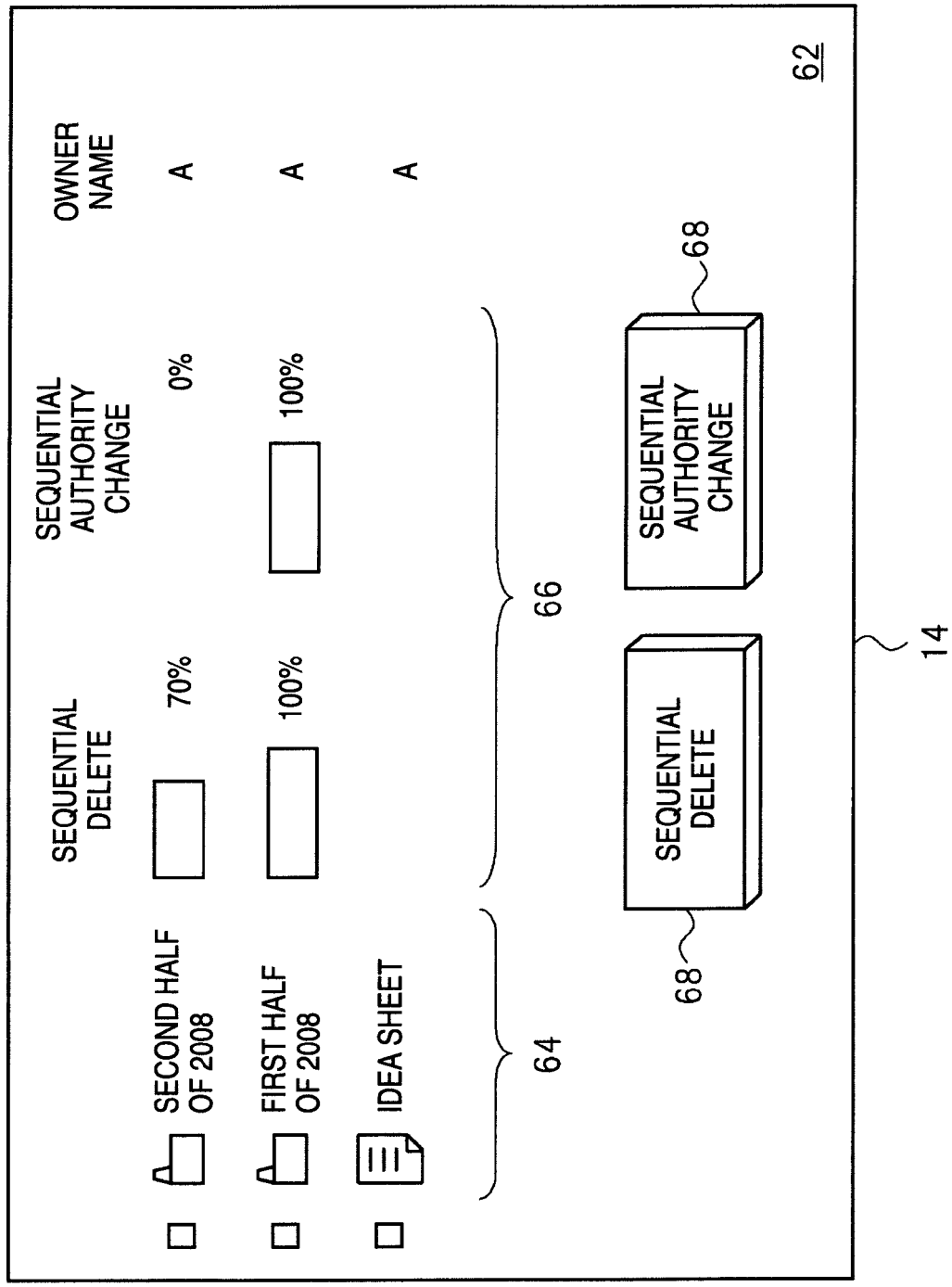
FIG. 7 is a diagram showing an example of an evaluation value corresponding image.

The displaying information generating and outputting portion 40 generates displaying information such as an evaluation value corresponding image 62 representing a corresponding relationship between the evaluating target information and the evaluation value 58 related to the evaluating target information and outputs the displaying information to an output device such as a display which is provided in the user terminal 14 (see FIG. 7). FIG. 7 shows an example of the evaluation value corresponding image 62. For example, in the case in which the evaluation value 58 and the request user information 56 are related to each other, the displaying information generating and outputting portion 40 may generate the evaluation value corresponding image 62 representing a corresponding relationship between the evaluating target information and the evaluation value 58 to which the request user information 56 corresponding to the user giving a request for outputting the evaluation value corresponding image 62 is related and may output the evaluation value corresponding image 62 to the output device such as the display which is provided in the user terminal 14 in response to the request for outputting the evaluation value corresponding image 62 which is given from the user indicated by the request user information 56 as is illustrated in FIG. 7.

The evaluation value corresponding image 62 illustrated in FIG. 7 includes at least an evaluating target information name image 64 indicative of a name of the evaluating target information and an evaluation value image 66 indicative of the evaluation value 58 related to the evaluating target information. The displaying information generating and outputting portion 40 may suppress an execution of the processing through the user so as not to display an image corresponding to the sequential processing corresponding to the evaluation value 58 (the evaluating target information name image 64 or an image indicative of an operation button 68 to be pressed down by the user giving a request for the processing which is illustrated in FIG. 7) when the evaluation value 58 is equal to or smaller than a predetermined value, for example. Moreover, the displaying information generating and outputting portion 40 may generate the evaluation value image 66 including an icon for a degree of transparency corresponding to the evaluation value 58 and may output the evaluation value image 66 to the output device such as the display which is provided in the user terminal 14.

Next, description will be given to the details of a processing for updating the evaluation value 58 through the evaluation value updating portion 36. In the exemplary embodiment, the evaluation value updating portion 36 executes an evaluation value batch update processing and an evaluation value each-time update processing, for example. The evaluation value updating portion 36 executes the evaluation value batch update processing for all of the evaluating target information once a day (for example, a time zone on the assumption that the number of the users is smaller than that in the other time zones (for instance, 2 a.m.)), for example. It is also possible to suppress the update processing or the deletion processing for the entity information through the processing executing portion 34 (that is, to bring a read only state) while the evaluation value updating portion 36 executes the evaluation value batch update processing.

Figure 8:
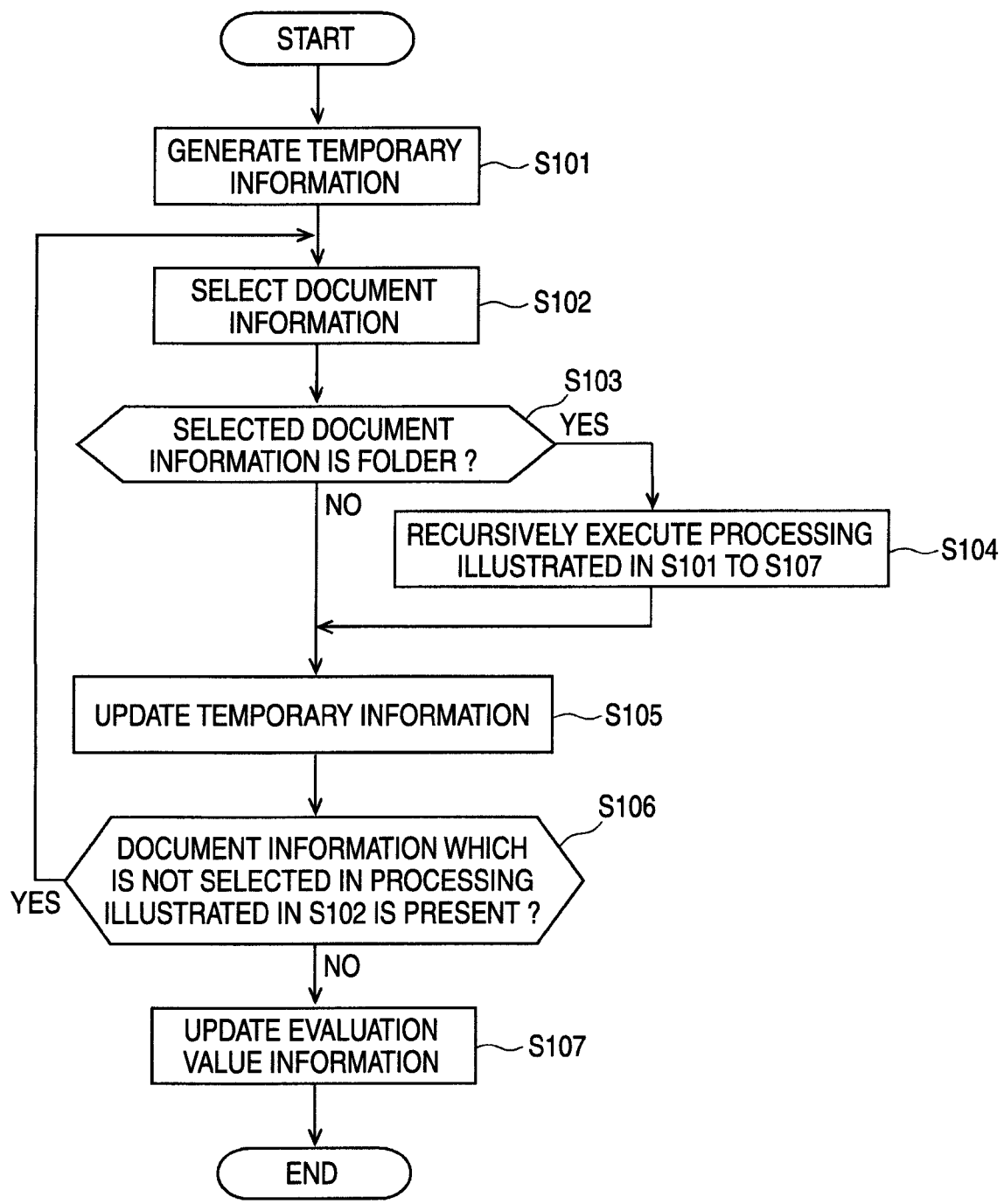
FIG. 8 is a flowchart showing an example of a flow of an evaluation value batch update processing to be carried out in the information processing system according to the exemplary embodiment.

An example of a flow of the evaluation value batch update processing through the evaluation value updating portion 36 will be described with reference to a flowchart of FIG. 8.

First of all, the evaluation value updating portion 36 generates at least one temporary information including a combination of the sequential processing name 54 and the request user information 56 based on the authority information 44 related to the predetermined document information 42 (for example, the folder 42*a*(A) to be a route folder) which is a target for starting the evaluation value batch update processing, for example (S101). More specifically, the evaluation value updating portion 36 generates temporary information including the sequential processing name 54 of "sequential deletion processing" and the request user information 56 of "all" and temporary information including the sequential processing name 54 of "sequential authority change processing" and the request user information 56 of "A, B" in the case in which the folder 42*a*(A) is related to the authority information 44 including the processing name 48 of "delete" and the permitted user information 50 of "all" and the authority information 44 including the processing name 48 of "authority change" and the permitted user information 50 of "A, B", for example. Thus, the processing name 48 corresponds to the sequential processing name 54, and the permitted user information 50 corresponds to the request user information 56.

Then, the evaluation value updating portion 36 selects one of the document information 42 which is related to the folder 42*a*(A) as the child document information 42 of the folder 42*a*(A) and over which processings illustrated in S103 to S105 are not executed (S102). Thereafter, the evaluation value updating portion 36 ascertains whether the document information 42 selected in the processing illustrated in the S102 is the folder 42*a* or not (S103). If the document information 42 selected in the processing illustrated in the S102 is the folder 42*a* (S103: Y), the evaluation value updating portion 36 recursively executes the processings illustrated in the S101 to S107 by setting the folder 42*a* as the document information 42 to be a target for starting the evaluation value batch update processing in the processing illustrated in the S101 (S104).

If the document information 42 selected in the processing illustrated in the S102 is not the folder 42*a* (S103: N) or the processing illustrated in the S104 is ended, the evaluation value updating portion 36 updates each temporary information based on the authority information 44 related to the document information 42 selected in the processing illustrated in the S102 (S105). Specifically, for example, the evaluation value updating portion 36 carries out an AND calculation for the user based on the authority information 44 related to the document information 42 selected in the processing illustrated in the S102 and the temporary information including the sequential processing name 54 corresponding to the processing name 48 included in the authority information 44. More specifically, for example, the evaluation value updating portion 36 updates the request user information 56 included in the temporary information to indicate a common user to the permitted user information 50 included in the authority information 44 related to the document information 42 selected in the processing illustrated in the S102 and the request user information 56 included in the temporary information corresponding to the authority information 44.

The evaluation value updating portion 36 ascertains whether the document information 42 which is not selected in the processing illustrated in the S102 is still present or not (S106). If the document information 42 is present (S106: Y), the evaluation value updating portion 36 executes the processing illustrated in the S102 again.

If the document information 42 is not present (S106: N), the evaluation value updating portion 36 updates the evaluation value information 52 related to the predetermined folder 42a (for example, the folder 42a(A)) indicated by the processing illustrated in the S101 based on the temporary information (S107). Specifically, for example, the evaluation value updating portion 36 deletes the evaluation value information 52 including the entity information identifier 46 corresponding to the folder 42a(A) which is stored in the evaluation value storing portion 32, and furthermore, generates the evaluation value information 52 including the entity information identifier 46 corresponding to the folder 42a(A), the sequential processing name 54 contained in the temporary information, the request user information 56 contained in the temporary information, the evaluation value 58 having a value of 100% and the evaluation value increase/decrease information 60 having a value of "false" and outputs the evaluation value information 52 to the evaluation value storing portion 32. Moreover, the evaluation value updating portion 36 generates the evaluation value information 52 including the entity information identifier 46 corresponding to the folder 42a(A), the sequential processing name 54 contained in the temporary information, the request user information 56 indicative of a user other than the user indicated by the request user information 56 contained in the temporary information, the evaluation value 58 having a value of 0%, and the evaluation value increase/decrease information 60 having a value of "true" and outputs the evaluation value information 52 to the evaluation value storing portion 32. Thus, the evaluation value increase/decrease information 60 indicates either an increase or a decrease of the evaluation value 58.

In the exemplary embodiment, the evaluation value updating portion 36 calculates the number of the descendant files 42b (the files 42b reached by following the child folder 42a in order) for the folder 42a in the evaluation value batch update processing and relates the same number to the folder 42a.

In the processing illustrated in the S104, in the case in which the folder 42a to be a target for recursively executing the processings illustrated in the S101 to S107 corresponds to the folder 42a reaching the document information 42 having no child document information 42 within a predetermined number (for example, three) in a direction of the child document information 42, for example, it is also possible to avoid the recursive execution.

When the user indicated by the request user information 56 contained in the temporary information is not present in the processing illustrated in the S105 after all of the child folders 42a in the folder 42a(A) are selected in the processing illustrated in the S102, moreover, the processing may be ended.

Figure 9:
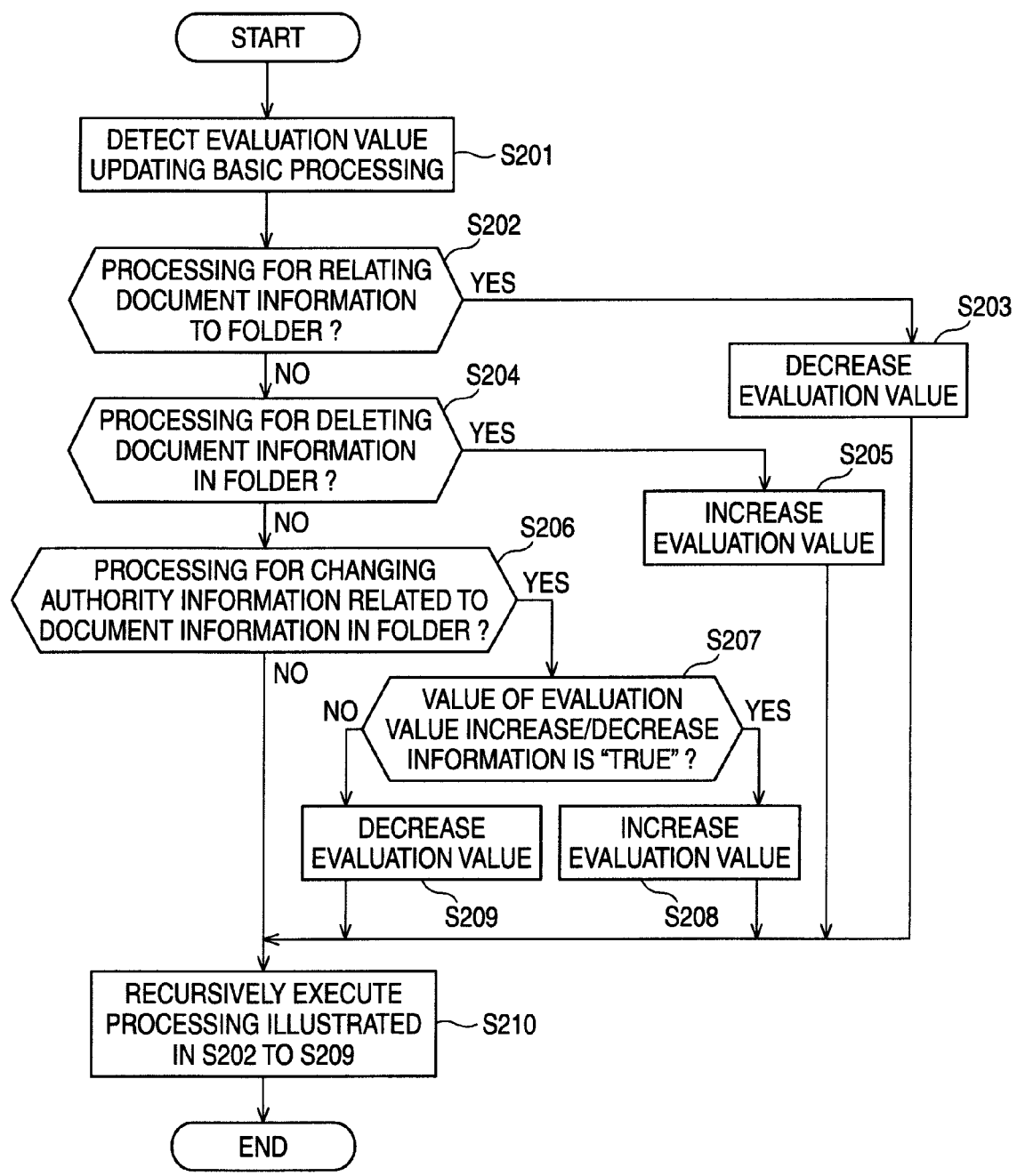
FIG. 9 is a flowchart showing an example of a flow of an evaluation value each-time update processing to be carried out in the information processing system according to the exemplary embodiment.

Next, an example of a flow of the evaluation value each-time update processing through the evaluation value updating portion 36 will be described with reference to a flowchart of FIG. 9.

In the exemplary embodiment, when executing the evaluation value updating basic processing for the document information 42, the processing executing portion 34 gives a notice of the content of the evaluation value updating basic processing to the evaluation value updating portion 36, for example. Then, the evaluation value updating portion 36 detects the content of the evaluation value updating basic processing (S201). In an example of the processing, the evaluation value updating basic processing represents a processing for relating the document information 42 to the folder 42a (a processing for adding the document information 42 into the folder 42a), a processing for deleting the document information 42 in the folder 42a or a processing for changing an authority indicated by the authority information 44 related to the document information 42 in the folder 42a. The evaluation value updating basic processing is not restricted to the processings described in the example of the processing but may be a lock processing to the document information 42 or a state changing operation processing, for example.

Then, the evaluation value updating portion 36 ascertains whether the content of the processing is the processing for relating the document information 42 to the folder 42a (the processing for adding the document information 42 into the folder 42a) or not (S202). If the content is the relation processing (S202: Y), the evaluation value updating portion 36 decreases the evaluation value 58 contained in the evaluation value information 52 related to the folder 42a (S203).

If the content is not the relation processing (S202: N), the evaluation value updating portion 36 ascertains whether the content of the processing detected by the processing illustrated in the S201 is the processing for deleting the document information 42 in the folder 42a or not (S204). If the content is the deletion processing (S204: Y), the evaluation value updating portion 36 increases the evaluation value 58 contained in the evaluation value information 52 related to the folder 42a (S205).

If the content is not the deletion processing (S204: N), the evaluation value updating portion 36 ascertains whether the content of the processing detected in the processing illustrated in the S201 is a processing for changing the authority indicated by the authority information 44 related to the document information 42 in the folder 42a or not (S206). If the content is the authority change processing (S206: Y), the evaluation value updating portion 36 confirms the value of the evaluation value increase/decrease information 60 contained in the evaluation value information 52 related to the folder 42a (S207). If a value of the evaluation value increase/decrease information 60 is "true" (S207: Y), the evaluation value updating portion 36 increases the evaluation value 58 contained in the evaluation value information 52 (S208). If the value of the evaluation value increase/decrease information 60 is "false" (S207: N), the evaluation value updating portion 36 decreases the evaluation value 58 contained in the evaluation value information 52 (S209). Thus, the evaluation value updating portion 36 may update the evaluation value 58 related to the evaluation value increase/decrease information 60 in accordance with the increase/decrease indicated by the evaluation value increase/decrease information 60.

For the parent folder 42a of the folder 42a over which the processing described in the example of the processing is executed, the processings illustrated in the S202 to 209 are recursively executed (S210). When updating the evaluation value 58 related to the evaluating target information, thus, the evaluation value updating portion 36 may update the evaluation value 58 related to the other evaluating target information related to the evaluating target information.

In the processings illustrated in the S203, S205, S208, S209 and S210 in the example of the processing, the evaluation value updating portion 36 may update the evaluation value 58 related to the evaluating target information into a value calculated based on the number of sequential processing target information corresponding to the evaluating target information (for example, the descendant document information 42 of the evaluating target information) before or after the execution of the evaluation value updating basic processing. Moreover, the evaluation value updating portion 36 may update the evaluation value 58 related to the evaluating target information into a value calculated based on the number of the descendant document information 42 related to the evaluating target information in the evaluation value batch update processing.

More specifically, for example, the evaluation value updating portion 36 may update the evaluation value 58 into a value calculated in accordance with an equation of $x \times (1-z/(y+z))$ (x: the evaluation value 58, y: the number of the descendant document information 42 before an addition, z: the number of the document information 42 in case of an authority related to the descendant after the addition (for example, z=1 in the case in which the authority information 44 indicative of the same authority is related to the document information 42 for all children or descendants)) in the processing illustrated in the S203. For example, when the evaluation value information 52 containing the evaluation value 58 having a value of 100% (the evaluation value information 52 indicative of the sequential deleting authority for all members in the example of FIG. 6) is related to the folder 42a(B) and the number of the descendant files 42b in the folder 42a(C) is nine, the evaluation value updating portion 36 may update the evaluation value 58 related to the folder 42a(B) into 90% ($100\% \times (1-1/(9+1))=90\%$) if one file 42b is added into the folder 42a(C).

For example, when the evaluation value information 52 containing the evaluation value 58 having a value of 100% is related to the folder 42a(A) and the number of the descendant files 42b in the folder 42a(A) is 99, the evaluation value updating portion 36 may update the evaluation value 58 related to the folder 42a(A) into 99% ($100\% \times (1-1/(99+1))=99\%$) in accordance with the equation if one file 42b is added into the folder 42a(B).

An equation for calculating the evaluation value 58 is not restricted to the equation described above. For example, it is also possible to use an equation of $a^z \times x$ (a: a constant of $0 < a < 1$ (for example, a value indicative of a possibility that a processing might not be carried out by a user permitted to execute the preceding processings), x, z: the same as those in the equation described above). In the case in which the document information 42 added into the folder 42a succeeds to the authority information 44 related to the folder 42a, moreover, the evaluation value updating portion 36 may prevent the evaluation value 58 from being decreased. If the evaluation value 58 is 0%, furthermore, the evaluation value updating portion 36 may prevent the evaluation value 58 from being decreased.

In the processing illustrated in the S205, for example, the evaluation value updating portion 36 may update the evaluation value 58 into a value calculated in accordance with an equation of $x \times (1+z/y)$ if the evaluation value 58 is not 0% and z/y (x: the evaluation value 58, y: the number of the descendant document information 42 before a deletion, z: the number of the document information 42 in case of an authority related to the descendant after the deletion) if the evaluation value 58 is 0%. For example, when the evaluation value information 52 containing the evaluation value 58 having a value of 0% is related to the folder 42a(B) (the evaluation value information 52 indicative of a sequential authority changing authority except for A and B in the example of FIG. 6) and the number of the descendant files 42b in the folder 42a(C) is ten, the evaluation value updating portion 36 may update the evaluation value 58 related to the folder 42a(B) into 11% ($1/(10+1)=11\%$) in accordance with the equation if one of the files 42b is deleted from the folder 42a(C). An equation for calculating the evaluation value 58 is not restricted to the equation described above. If the evaluation value 58 is 100%, moreover, the evaluation value updating portion 36 may prevent the evaluation value 58 from being increased.

In the processing illustrated in the S208, moreover, the evaluation value updating portion 36 may update the evaluation value 58 into a value calculated in accordance with an equation of $x \times (1+z/y)$ (the case in which the evaluation value 58 is not 0%) or z/y (the case in which the evaluation value 58 is 0%), for example. In the processing illustrated in the S209, furthermore, the evaluation value updating portion 36 may update the evaluation value 58 into a value calculated in accordance with the equation of $x \times (1-z/(y+z))$.

In addition, the evaluation value updating portion 36 may prevent the evaluation value 58 from being updated into 0% or 100%.

The evaluation value each-time update processing is not restricted to the examples of the processing.

For example, the storing portion 22 may hold a history of the evaluation value updating basic processing to be executed by the processing executing portion 34 after the evaluation value batch update processing. For example, when it is detected that the added document information 42 is deleted by the processing illustrated in the S201, the evaluation value updating portion 36 may calculate the updated evaluation value 58 based on the history held by the storing portion 22 on the assumption that the document information 42 is not present from the beginning. When it is confirmed based on the history held in the storing portion 22 that the processing executing portion 34 executes the processing for changing the authority indicated by the related authority information 44 at least twice for the same document information 42, for example, the evaluation value updating portion 36 may prevent the evaluation value 58 from being updated.

When detecting the execution of the evaluation value updating basic processing in the processing illustrated in the S201, for example, the evaluation value updating portion 36 may select a predetermined number of descendant document information 42 in the folder 42a to be the evaluating target information (which may be a number set corresponding to a request given from the user) and may update the evaluation value 58 into a value calculated based on the authority information 44 related to the document information 42 or an attribute. For example, the evaluation value updating portion 36 may update the evaluation value 58 into a value calculated based on a number in which an attribute of the user indicated by the request user information 56 contained in the evaluation value information 52 is coincident with an attribute of a registrant or an administrator of the document information 42. Moreover, the evaluation value updating portion 36 may update the evaluation value 58 into a value calculated by evaluating a degree at which the attribute of the user indicated by the request user information 56 contained in the evaluation value information 52 and the registrant or administrator of the document information 42 are systematically close to each other. The evaluation value updating portion 36 may select the document information 42 to be selected based on a random function or an attribute related to the document information 42 (for example, in order from the newest registration date), for instance. The number of the document information 42 to be selected by the evaluation value updating portion 36 may be determined based on the number of the descendant document information 42 of the evaluating target information.

For example, the evaluation value updating portion 36 may update the evaluation value 58 into a value calculated based on the number of the child document information 42 succeeding to the authority information 44 related to the folder 42a. For example, the storing portion 22 may hold the number of the child document information 42 succeeding to the authority information 44 related to the folder 42a and the evaluation value updating portion 36 may update the evaluation value 58 into a value calculated in an equation of (the number of the child document information 42 succeeding to the authority information 44/the total number of the child document information 42).

For example, the evaluation value updating portion 36 may update the evaluation value 58 of the certain folder 42a into a value calculated based on the evaluation value 58 related to the child (or descendant) document information 42 of the same folder 42a (for instance, a value based on a product of the evaluation value 58).

Moreover, the executing order determining portion 38 may determine the executing order based on an evaluation value calculated on the basis of the evaluation value 58 related to the folder 42a and the evaluation value 58 related to the child (or descendant) document information 42 of the same folder 42a (for example, a calculated evaluation value based on the product of the evaluation value 58). Furthermore, the displaying information generating and outputting portion 40 may generate the evaluation value corresponding image 62 representing a corresponding relationship between the evaluating target information and the calculated evaluation value calculated for the evaluating target information and may output the evaluation value corresponding image 62 to an output device such as a display which is provided in the user terminal 14.

In addition, the evaluation value information 52 may contain two types of evaluation values 58 (for example, the first evaluation value 58 and the second evaluation value 58). The evaluation value updating portion 36 may store a value calculated by the same processing as the example of the processing for the first evaluation value 58 in the evaluation value storing portion 32 in relation to the folder 42a based on the child (or descendant) file 42b of the folder 42a, for example. Moreover, the evaluation value updating portion 36 may update the second evaluation value 58 into a value calculated based on the first evaluation value 58.

Furthermore, the evaluation value updating portion 36 may calculate the second evaluation value 58 related to the folder 42a based on the first evaluation value 58 related to the folder 42a and the second evaluation value 58 related to the child (or descendant) folder 42a of the folder 42a, for example. Specifically, in the case in which the first and second evaluation values 58 related to the folder 42a(D) are 90% and the first evaluation value 58 related to the folder 42a(3) is 100%, for example, the evaluation value updating portion 36 may update the second evaluation value 58 related to the folder 42a(B) into 90% (100%×90%=90%). In the case in which the first and second evaluation values 58 related to the folder 42a(C) are 40% and the first evaluation value 58 related to the folder 42a(A) is 60%, furthermore, the evaluation value updating portion 36 may update the second evaluation value 58 related to the folder 42a(A) into 21.6% (90%×40%×60%=21.6%).

The invention is not restricted to the exemplary embodiment.

For example, the information processing apparatus 12 may be constituted by a single housing or plural of housings. Moreover, the exemplary embodiment may be applied to a stand-alone type program. The specific numeric values and character strings described in the specification are only illustrative and the invention is not restricted thereto.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various exemplary embodiments and with the various modifications as are suited to the particular use contemplated. It is intended that the scope of the invention be defined by the following claims and their equivalents.

What is claimed is:

1. A non-transitory computer readable medium storing a program causing a computer to execute a process for determining an executing order, the process comprising:
storing a first evaluation value in association with first evaluating target information and a second evaluation value in association with second evaluating target information, the first evaluation value indicating a first possibility of success of executing a first processing on the first evaluating target information, and the second evaluation value indicating a second possibility of success of executing the first processing on the second evaluating target information;
executing a second processing on the first evaluation target information and the second evaluation target information and updating the first evaluation value related to the first evaluating target information and the second evaluation value related to the second evaluating target information based on a type of the second processing; and
determining an execution order of sequentially executing the first processing on the first evaluating target information and the second evaluating target information based on the first evaluation value related to the first evaluating target information and the second evaluating value related to the second evaluating target information; and
displaying information indicating the execution order on a display,
wherein the first evaluation value and the second evaluation value are related to a user, and
the execution order is determined based on the first evaluation value and the second evaluation value related to the user requiring to sequentially execute the first processing on the first evaluating target information and the second evaluating target information.

2. The non-transitory computer readable medium according to claim 1, wherein the second evaluation value related to the second evaluating target information is updated when the first evaluation value related to the first evaluating target information is updated.

3. The non-transitory computer readable medium according to claim 1, wherein the first evaluation value related to the first evaluating target information is updated based on a number of information to be a processing target of the first processing.

4. The non-transitory computer readable medium according to claim 1, wherein the first evaluation value is related to adjustment information for the first evaluation value indicative of an increase or a decrease of the first evaluation value, and the first evaluation value is updated according to the increase or the decrease indicated by the adjustment information for the first evaluation value.

5. The non-transitory computer readable medium according to claim 1, wherein the first evaluation value is related to a plurality of types of processings, respectively.

6. The non-transitory computer readable medium according to claim 1, further comprising:

executing a processing for carrying out a return to a state brought when the first processing is unsuccessfully executed one of the first evaluating target information and the second evaluating target information.

7. The non-transitory computer readable medium according to claim 1, wherein the execution order is determined in ascending order of the first evaluation value and the second evaluation value.

8. A non-transitory computer readable medium storing a program causing a computer to execute a process for determining an executing order, the process comprising:

storing a first evaluation value in association with first evaluating target information and a second evaluation value in association with second evaluating target information, the first evaluation value indicating a first possibility of success of executing a first processing on the first evaluating target information, and the second evaluation value indicating a second possibility of success of executing the first processing on the second evaluating target information;

executing a second processing on the first evaluation target information and the second evaluation target information and updating the first evaluation value related to the first evaluating target information and the second evaluation value related to the second evaluating target information based on a type of the second processing; and displaying first information representing a corresponding relationship between the first evaluating target information and the first evaluation value related to the first evaluating target information and second information representing a corresponding relationship between the second evaluating target information and the second revaluation value related to the first evaluating target information, the displayed first and second information indicating an execution order of sequentially executing the first processing on the first evaluating target information and the second evaluating target information related to the first evaluating target information and the second evaluating target information based on the second evaluation value related to the second evaluating target information, wherein the first evaluation value and the second evaluation value are related to a user, and the execution order is determined based on the first evaluation value and the second evaluation value related to the user requiring to sequentially execute the first processing on the first evaluating target information and the second evaluating target information.

9. The non-transitory computer readable medium according to claim 8, wherein the first evaluation value and the second evaluation value are related to a user, and the displaying comprises displaying the first information and the second in response to a request of the user.

10. An information processing apparatus comprising:

an evaluation value storing portion that stores a first evaluation value in association with first evaluating target information and a second evaluation value in association with second evaluating target information, the first evaluation value indicating a first possibility of success of executing a first processing on the first evaluating target information, and the second evaluation value indicating a second possibility of success of executing the first processing on the second evaluating target information;

a processor that functions as an evaluation value updating portion that executes a second processing on the first evaluation target information and the second evaluation target information and updates the first evaluation value related to the first evaluating target information and the second evaluation value related to the second evaluating target information based on a type of the second processing; and an executing order determining portion that determines an execution order of sequentially executing the first processing on the first evaluating target information and the second evaluating target information based on the first evaluation value related to the first evaluating target information and the second evaluation value related to the second evaluating target information; and a display that displays information indicating the execution order, wherein the first evaluation value and the second evaluation value are related to a user, and the execution order is determined based on the first evaluation value and the second evaluation value related to the user requiring to sequentially execute the first processing on the first evaluating target information and the second evaluating target information.

11. The information processing apparatus according to claim 10, wherein the execution order is determined in ascending order of the first evaluation value and the second evaluation value.

12. An information processing apparatus comprising:

an evaluation value storing portion that stores a first evaluation value in association with first evaluating target information and a second evaluation value in association with second evaluating target information, the first evaluation value indicating a first possibility of success of executing a first processing on the first evaluating target information, and the second evaluation value indicating a second possibility of success of executing the first processing on the second evaluating target information;

a processor that functions as an evaluation value updating portion that executes a second processing on the first evaluation target information and the second evaluation target information and updates the first evaluation value related to the first evaluating target information and the second evaluation value related to the second evaluating target information based on a type of the second processing; and a displaying information generating and outputting portion that generates and outputs first displaying information representing a corresponding relationship between the first evaluating target information and the first evaluation value related to the first evaluating target information and second information representing a corresponding relationship between the second evaluating target information and the second evaluation value related to the first evaluating target information, the displayed first and second information indicating an execution order of sequentially executing the first processing on the first evaluating target information and the second evaluating target information related to the first evaluating target information and the second evaluating target information based on the second evaluation value related to the second evaluating target information, wherein the first evaluation value and the second evaluation value are related to a user, and the execution order is determined based on the first evaluation value and the second evaluation value related to the user requiring to sequentially execute the first processing on the first evaluating target information and the second evaluating target information.

* * * * *